(12) United States Patent
Marshall et al.

(10) Patent No.: US 6,208,913 B1
(45) Date of Patent: Mar. 27, 2001

(54) CHEMICAL INJECTION SYSTEM

(75) Inventors: Stephen E. Marshall; Mark V. Zeck, both of Snyder, TX (US)

(73) Assignee: YZ Systems, Inc., Conroe, TX (US)

( * ) Notice: Subject to any disclaimer, the term of this patent is extended or adjusted under 35 U.S.C. 154(b) by 0 days.

(21) Appl. No.: 08/999,932

(22) Filed: Aug. 18, 1997

Related U.S. Application Data

(63) Continuation-in-part of application No. 08/423,293, filed on Apr. 18, 1995, now abandoned, which is a continuation-in-part of application No. 08/083,135, filed on Jun. 25, 1993, now Pat. No. 5,406,970.

(51) Int. Cl.[7] .................................................. G05B 13/00
(52) U.S. Cl. ................................ 700/266; 48/195; 137/3; 137/88
(58) Field of Search ................................ 48/195; 137/3, 137/88; 364/502; 700/266

(56) References Cited

U.S. PATENT DOCUMENTS

| | | | |
|---|---|---|---|
| 3,163,173 | * 12/1964 | Kuntz | 137/93 |
| 3,523,771 | * 8/1970 | Anderson | 436/3 |
| 3,534,753 | * 10/1970 | Ollivier | 137/7 |
| 3,545,949 | * 12/1970 | Oister | 48/195 |
| 3,634,053 | * 1/1972 | Klass et al. | 48/195 |
| 4,180,083 | 12/1979 | Miyaoka et al. | 137/101.25 |
| 4,258,421 | * 3/1981 | Juhasz et al. | 364/424.04 |
| 4,424,859 | * 1/1984 | Sims et al. | 166/67 |
| 4,436,674 | 3/1984 | McMenamin | 261/64 B |
| 4,611,294 | 9/1986 | Stanfill | 364/173 |
| 5,026,488 | * 6/1991 | Mesheau | 210/799 |
| 5,032,063 | 7/1991 | Zeck et al. | 417/383 |
| 5,406,970 | * 4/1995 | Marshall et al. | 137/101.25 |
| 5,540,251 | * 7/1996 | Mayeaux | 137/88 |

FOREIGN PATENT DOCUMENTS

0203782 A2 * 12/1986 (EP).
WO 90/03496 * 4/1990 (WO).

OTHER PUBLICATIONS

"Gravimetric disc feeder offers accurate dosing of additives"; Modern Plastics; Dec. 1996, p. 24, (Abstract Only).*
Y–Z Industries, Inc., NJEX–1700 Odorant Injection System Manual, pp. 3,5–11,13–21,26–32,34 & 36, May 18, 1992.
Meyer, Winston C., Institute of Gas Technology Odorization Symposium, Small Station Odorizers, Aug. 31, 1992, pp 1–14.
American Gas Association, Operating Section Report, Odorization Manual, 1983, pp 32–35.

* cited by examiner

Primary Examiner—Edward R. Cosimano

(57) ABSTRACT

A system for injecting chemicals, e.g., odorants, from a chemical supply into a conduit or container includes three primary components, a pump for injecting the odorant, a metering device, and a programmable controller. The controller is preferably powered by a solar panel to facilitate use of the system in remote areas for long periods of time. A removable data carrier, such as a memory module, is connected to the controller to collect odorant system event data. The data carrier is removable from the controller and the data therein may be downloaded into an auxiliary audit computer for generation of summary audit reports. The system precisely monitors how much odorant is used per pump stroke and insures that the odorant injection rate remains constant irrespective of environmental or equipment variations which might otherwise cause inaccuracies in the measurement of odorant usage data and/or the fluctuation of the odorant injection rate.

18 Claims, 9 Drawing Sheets

FIG. 6

| | | |
|---|---|---|
| Unit Location: ANYWHERE ONLY GATE | | Log Start: 10-27-93 |
| Serial No: 00000    File: 00000.MOD | | Log End: 11-11-93 |
| PAGE 1 | | |
| EVENT | DOU = Dialy Odorant Usage | TIME  DATE |

| EVENT | TIME | DATE |
|---|---|---|
| ******** START OF LOG ******** | | |
| PARAMETER CHANGE | 09:32 | 10-27-93 |
| SYSTEM START – PropFlow (Analog Linear) | 09:32 | 10-27-93 |
| DOU – 13.467 lbs. @ 0.500 lbs/mmscf | 07:00 | 10-28-93 |
| DOU – 15.015 lbs. @ 0.500 lbs/mmscf | 07:00 | 10-29-93 |
| DOU – 14.997 lbs. @ 0.500 lbs/mmscf | 07:00 | 10-30-93 |
| DOU – 15.004 lbs. @ 0.500 lbs/mmscf | 07:00 | 10-31-93 |
| DOU – 14.994 lbs. @ 0.500 lbs/mmscf | 07:00 | 11-01-93 |
| DOU – 15.013 lbs. @ 0.500 lbs/mmscf | 07:00 | 11-02-93 |
| DOU – 15.006 lbs. @ 0.500 lbs/mmscf | 07:00 | 11-03-93 |
| DOU – 14.997 lbs. @ 0.500 lbs/mmscf | 07:00 | 11-04-93 |
| DOU – 14.954 lbs. @ 0.500 lbs/mmscf | 07:00 | 11-05-93 |
| DOU – 15.014 lbs. @ 0.500 lbs/mmscf | 07:00 | 11-06-93 |
| DOU – 15.019 lbs. @ 0.500 lbs/mmscf | 07:00 | 11-07-93 |
| PUMP ALARM ON – pump failure | 14:22 | 11-07-93 |
| STANDBY ON | 16:46 | 11-07-93 |
| STANDBY OFF | 17:03 | 11-07-93 |
| PUMP ALARM OFF – pump failure | 17:15 | 11-07-93 |
| DOU – 13.738 lbs. @ 0.458 lbs/mmscf <Low Inj. Rate> | 07:00 | 11-08-93 |
| DOU – 14.966 lbs. @ 0.499 lbs/mmscf | 07:00 | 11-09-93 |
| DOU – 15.002 lbs. @ 0.500 lbs/mmscf | 07:00 | 11-10-93 |
| STANDBY ON | 10:14 | 11-10-93 |
| DOU – 1.868 lbs. @ 0.498 lbs/mmscf | 07:00 | 11-11-93* |
| ******** END OF LOG ******** | | |

| | |
|---|---|
| Alarm Count: 1    From: 10-27-93 (09:32) | To: 11-11-93 (07:00) |
| Avg. Injection Rate: 0.497 lbs/mmscf | Low Injection Rate: 0.075 lbs/mmscf |
| Total Odorant Used: 209.054 lbs. | High Injection Rate: 0.0505 lbs/mmscf |

FIG. 7

| | |
|---|---|
| Unit Location: ANYWHERE ONLY GATE | Log Start: 10-27-93 |
| Serial No: 00000    File: 00000.MOD | Log End: 11-11-93 |
| PAGE 1 | |

System Alarm Status              '*' - change 100

Pump Alarms:
   Pump failure . . . . . . . . . ON*
   OverPump . . . . . . . . . . . OFF
   UnderPump . . . . . . . . . . OFF Verometer Alarms:
   Fill Valve . . . . . . . . . . . OFF
   Fill Rate . . . . . . . . . . . . OFF
   Over Fill . . . . . . . . . . . . OFF
   Slow Fill . . . . . . . . . . . . OFF
   No Fill . . . . . . . . . . . . . OFF
   Cable . . . . . . . . . . . . . . OFF Signal Alarms:
   Over Flow > = 125% . . . . . . . OFF
   Over Flow < 125% (Non-Alarm) . . OFF
   Low Flow (Non-Alarm) . . . . . . OFF
   No Flow (Non-Alarm) . . . . . . OFF
   Loss of Signal . . . . . . . . . OFF Miscellaneous:
   Standby (Non-Alarm) . . . . . . OFF
   Alarm Switch . . . . . . . . . . OFF
   Battery Alarm . . . . . . . . . OFF
   Supply Tank Level Alarm . . . . OFF From: 11-07-93 (14:22)   To: 11-07-93 (16:46)

FIG. 8

| | |
|---|---|
| Unit Location: ANYWHERE ONLY GATE | Log Start: 10-27-93 |
| Serial No: 00000   File: 00000.MOD | Log End: 11-11-93 |
| PAGE 1 | |
| System Parameters | '*' – change |

PropFlow: (Analog Linear)
Injection Rate . . . . . . . . 0.50 lbs/mmscf
Max Gas Flow . . . . . . . 2.50 mmscf/hr
Pump Displacement . . . . 1.00 cc/stroke
Odorant Density . . . . . . 6.80 lbs/gal
Flow (No Signal) . . . . . . Disabled
Low Flow Shutoff . . . . . Disabled
PropTime Time/strk . . . . 0.02 minutes
Odorant Out Pulse . . . . . 0.01 lbs/pulse
Supply Tank Alarm . . . . . 10%
Max Time/Stroke . . . . . . Disabled
Analog Zero . . . . . . . . 1.00 volt
Analog Span . . . . . . . . 5.00 volt
PPS Span . . . . . . . . . 50 pulses/sec
PPM Span . . . . . . . . . 30 pulses/min
Verometer . . . . . . . . . 0498-0512-0503
Supply Tank Level Alarm . . . Enabled
Signal Alarms . . . . . . . Enabled
Verometer Alarms . . . . . Enabled
Pump Alarms . . . . . . . Enabled
Battery Alarm . . . . . . . Enabled From: 11-27-93 (9:32)   To: 11-11-93 (7:00)

FIG. 9

| Unit Location: ANYWHERE ONLY GATE | | | | | | | | Log Start: 10-27-93 | |
|---|---|---|---|---|---|---|---|---|---|
| Serial No: 00000  File: 00000.MOD | | | | | | | | Log End: 11-11-93 | |
| PAGE 1 | | | | | | | | | |
| DATE | TIME | lbs | mmscf | lbs\mmcf | Batt V | Odor | Tmp | PmpDispl | % Flow |
| ******** START OF LOG ******** | | | | | | | | | |
| 10-27-93 | 10:00 | 0.330 | 0.662 | 0.498 | 16.0V | | 20.5C | 1.003cc | 50.2% |
| 10-27-93 | 11:00 | 0.622 | 1.250 | 0.498 | 16.3V | | 19.5C | 0.996cc | 49.8% |
| 10-27-93 | 12:00 | 0.631 | 1.250 | 0.505 | 16.1V | | 19.0C | 0.997cc | 50.1% |
| 10-27-93 | 13:00 | 0.619 | 1.250 | 0.495 | 15.7V | | 23.4C | 0.995cc | 50.1% |
| 10-27-93 | 14:00 | 0.625 | 1.250 | 0.500 | 15.8V | | 23.4C | 0.999cc | 50.0% |
| 10-27-93 | 15:00 | 0.628 | 1.250 | 0.502 | 15.9V | | 20.0C | 1.003cc | 50.2% |
| 10-27-93 | 16:00 | 0.621 | 1.250 | 0.497 | 15.8V | | 20.5C | 0.994cc | 49.6% |
| 10-27-93 | 17:00 | 0.628 | 1.250 | 0.502 | 15.9V | | 18.0C | 1.003cc | 50.0% |
| 10-27-93 | 18:00 | 0.630 | 1.250 | 0.504 | 15.6V | | 20.0C | 1.006cc | 49.9% |
| 10-27-93 | 19:00 | 0.630 | 1.250 | 0.504 | 16.3V | | 19.0C | 1.003cc | 50.5% |
| 10-27-93 | 20:00 | 0.628 | 1.250 | 0.502 | 16.1V | | 21.9C | 0.995cc | 49.5% |
| 10-27-93 | 21:00 | 0.626 | 1.250 | 0.501 | 16.2V | | 22.9C | 1.004cc | 49.9% |
| 10-27-93 | 22:00 | 0.626 | 1.250 | 0.501 | 16.1V | | 19.5C | 1.002cc | 49.9% |
| 10-27-93 | 23:00 | 0.629 | 1.250 | 0.503 | 16.2V | | 20.5C | 1.005cc | 50.0% |
| 10-28-93 | 00:00 | 0.620 | 1.250 | 0.496 | 16.2V | | 19.5C | 1.001cc | 50.2% |
| 10-28-93 | 01:00 | 0.620 | 1.250 | 0.496 | 15.9V | | 20.0C | 1.001cc | 50.4% |
| 10-28-93 | 02:00 | 0.624 | 1.250 | 0.499 | 15.9V | | 18.5C | 0.996cc | 50.5% |
| 10-28-93 | 03:00 | 0.624 | 1.250 | 0.499 | 15.7V | | 21.4C | 0.998cc | 50.0% |
| 10-28-93 | 04:00 | 0.625 | 1.250 | 0.500 | 16.0V | | 21.9C | 1.001cc | 50.2% |
| 10-28-93 | 05:00. | 0.631 | 1.250 | 0.505 | 16.2V | | 18.0C | 1.005cc | 50.1% |
| 10-28-93 | 06:00 | 0.627 | 1.250 | 0.502 | 16.0V | | 22.9C | 1.000cc | 50.2% |
| 10-28-93 | 07:00 | 0.623 | 1.250 | 0.498 | 16.0V | | 22.9C | 0.995cc | 49.8% |
| 10-28-93 | 08:00 | 0.625 | 1.250 | 0.500 | 16.1V | | 23.4C | 0.997cc | 50.0% |
| 10-28-93 | 09:00 | 0.622 | 1.250 | 0.498 | 15.9V | | 19.0C | 1.006cc | 50.3% |
| 10-28-93 | 10:00 | 0.630 | 1.250 | 0.504 | 16.3V | | 21.9C | 1.004cc | 50.5% |
| 10-28-93 | 11:00 | 0.625 | 1.250 | 0.500 | 15.9V | | 20.5C | 0.996cc | 50.4% |
| 10-28-93 | 12:00 | 0.629 | 1.250 | 0.503 | 15.9V | | 21.4C | 1.002cc | 50.4% |
| 10-28-93 | 13:00 | 0.622 | 1.250 | 0.498 | 15.7V | | 20.9C | 1.005cc | 49.7% |
| 10-28-93 | 14:00 | 0.626 | 1.250 | 0.501 | 16.0V | | 20.9C | 1.004cc | 50.2% |
| 10-28-93 | 15:00 | 0.630 | 1.250 | 0.504 | 15.9V | | 22.9C | 0.995cc | 50.4% |
| 10-28-93 | 16:00 | 0.626 | 1.250 | 0.501 | 16.2V | | 19.0C | 0.997cc | 50.2% |
| 10-28-93 | 17:00 | 0.623 | 1.250 | 0.498 | 16.2V | | 23.4C | 1.006cc | 50.2% |
| 10-28-93 | 18:00 | 0.621 | 1.250 | 0.497 | 16.1V | | 22.4C | 1.000cc | 50.2% |
| 10-28-93 | 19:00 | 0.627 | 1.250 | 0.502 | 16.3V | | 20.9C | 1.004cc | 49.6% |
| 10-28-93 | 20:00 | 0.624 | 1.250 | 0.499 | 15.8V | | 18.5C | 1.002cc | 50.0% |
| 10-28-93 | 21:00 | 0.630 | 1.250 | 0.504 | 15.9V | | 21.4C | 0.994cc | 50.4% |
| 10-28-93 | 22:00 | 0.620 | 1.250 | 0.496 | 15.9V | | 21.9C | 1.004cc | 50.0% |
| 10-28-93 | 23:00 | 0.629 | 1.250 | 0.503 | 15.6V | | 22.9C | 1.006cc | 50.2% |
| 10-29-93 | 00:00 | 0.624 | 1.250 | 0.499 | 15.7V | | 20.9C | 1.001cc | 49.7% |
| 10-29-93 | 01:00 | 0.621 | 1.250 | 0.497 | 15.9V | | 19.5C | 0.994cc | 50.2% |
| 10-29-93 | 02:00 | 0.625 | 1.250 | 0.500 | 16.1V | | 20.0C | 1.004cc | 50.1% |
| 10-29-93 | 03:00 | 0.624 | 1.250 | 0.499 | 15.8V | | 20.9C | 1.001cc | 50.0% |
| 10-29-93 | 04:00 | 0.628 | 1.250 | 0.502 | 15.9V | | 20.9C | 0.998cc | 49.6% |
| 10-29-93 | 05:00. | 0.627 | 1.250 | 0.502 | 16.1V | | 21.9C | 1.004cc | 50.0% |
| 10-29-93 | 06:00 | 0.628 | 1.250 | 0.502 | 15.9V | | 21.9C | 0.995cc | 50.0% |
| 10-29-93 | 07:00 | 0.629 | 1.250 | 0.503 | 15.9V | | 19.5C | 0.999cc | 49.7% |
| 10-29-93 | 08:00 | 0.629 | 1.250 | 0.503 | 15.8V | | 22.9C | 0.995cc | 50.4% |
| 10-29-93 | 09:00 | 0.630 | 1.250 | 0.504 | 15.8V | | 21.4C | 1.000cc | 50.4% |
| 10-29-93 | 10:00 | 0.630 | 1.250 | 0.504 | 16.2V | | 23.4C | 0.997cc | 50.0% |
| 10-29-93 | 11:00 | 0.624 | 1.250 | 0.499 | 16.2V | | 20.9C | 0.997cc | 49.7% |
| 10-29-93 | 12:00 | 0.626 | 1.250 | 0.501 | 15.7V | | 19.5C | 1.005cc | 49.9% |
| 10-29-93 | 13:00 | 0.622 | 1.250 | 0.498 | 16.3V | | 21.4C | 1.001cc | 50.2% |

From: 11-27-93 (9:32)   To: 11-11-93 (7:00)

CHEMICAL INJECTION SYSTEM

This application is a continuation-in-part of U.S. patent application Ser. No. 08/083,135, now U.S. Pat. No. 5,406,970 filed Jun. 25, 1993 which is a CIP of 08/423,293 filed Apr. 18, 1995.

TECHNICAL FIELD

The present invention relates generally to chemical injection systems and more particularly to methods and systems for monitoring and controlling the injection of odorants, corrosion inhibitors, lubricants or other additives into gas and liquid conduits and fluid container.

BACKGROUND OF THE INVENTION

Odor levels within gases or liquids are usually monitored by several techniques, including the room test and the use of a dilution apparatus such as an odor tester, odorometer or odorator. Although there are various procedures involved in odor-level determination, the most common mechanism used in the industry is the human nose. Because the objective is to determine the actual degree of odor, not the amount of odorant, the human olfactory sense continues to serve as the standard of pungency.

Systems for injecting odorants are well known in the prior art. Such systems typically include a pump for injecting an odorant into a system, and some timer or other controller to effect actuation of the pump at predetermined intervals. Because it is important to know the total volume of odorant injected into a fluid system over the period of operation, more sophisticated systems in the art include verification devices to determine the quantity of odorant injected. One such injection system, designated by the Model No. NJEX-7100 and offered by the assignee of the present invention, included a positive-displacement pump for injecting odorant into a pipeline, a controller, a flow switch connected to the outlet side of the odorant pump, and an odorant inlet meter for metering the odorant to the pump. The controller tracked the flow rate of the gas in the pipeline using a flow signal, and this signal was also used to calculate the stroke rate of the pump. Monitoring was achieved by the flow switch and the inlet meter. In particular, the flow switch interfaced to a counter to provide a continuous readout of the number of strokes, and the meter served as an additional monitor by counting the number of times the meter was refilled. From the number of strokes and a preset pump displacement setting (in cc/stroke), the purported volume of odorant injected was calculated. The system also included appropriate alarm circuitry for signaling the user in the event of a malfunction.

While injection systems such as described above provided significant operational advantages and improvements over the prior art techniques and devices, they provided somewhat "coarse" odorant usage data. For example, such systems were not capable of precisely monitoring how much odorant was being used per pump stroke because despite the preset pump displacement setting, the actual odorant displacement per stroke changed due to pump efficiency variations, static pressure variations, check valve performance variations, line debris and variations in the density of the odorant. Such variations caused inaccuracies in the odorant usage data, especially where the system was operating over long periods of time and in harsh environmental conditions. While these systems did provide quantitative raw data for analysis, adjustment and accountability of the odorant usage, they did not have any capability to present such data in any type of useful format to facilitate audit or reporting of system operation. The systems, although quite sufficient for their intended purpose, were also costly and had to be operated by experienced personnel.

Accordingly, there remains a long felt need for improved odorant injection systems which overcome these and other problems associated with the prior art.

BRIEF SUMMARY OF THE INVENTION

It is a primary object of the present invention to provide a total system approach to chemical injection, metering and monitoring to facilitate collection by pipeline operators and others of detailed quantitative data for analysis, adjustment and accountability.

It is further object of the invention to provide such an injection system that is extremely reliable, requires little or no maintenance, is solar-powered and which can be left unattended in harsh environments.

It is still another object of the invention to provide an injection system using a pump and a meter which precisely monitors how much chemical is injected per stroke of the pump. The system precisely monitors how much chemical is used per stroke irrespective of pump efficiency variations, static pressure variations, equipment performance variations, line debris and variations in the density of the chemical, among other factors, which variations or problems might otherwise cause inaccuracies in the measurement of chemical usage data.

It is yet a further object of the invention to provide an injection system using a pump and a temperature-compensated chemical inlet meter which accurately measures and verifies the amount of chemical injected.

It is still another important object of the invention to provide a chemical injection system with an auxiliary audit system comprising a detachable monitor module connected to the system controller, and an audit computer. The module is designed to collect chemical event usage data (e.g., the time and date of each alarm, the time and date of system parameter changes, the actual chemical injected, etc.) over a relatively long period of time, e.g., several months. The monitor module is removed from the system controller at periodic intervals and the data therein downloaded into the audit computer; alternatively, the monitor module may be polled in the field over a telephone or other telecommunications link. The usage data is processed in the audit computer to generate useful displays or reports of injection system events.

It is a further object of the invention to provide in such a system verification of pre-set proportional-to-flow odorization rates, an easy, positive method of odorization documentation and system monitoring and alarm functions capable of notifying the operator in the event of a malfunction.

These and other objects of the invention are provided in a system for injecting a chemical, such as an odorant, from a chemical supply into a conduit or container. In one embodiment, the system comprises three primary components: a pump, a meter and a controller. The pump has an inlet, and an outlet connectable to a conduit or container. The meter supports a predetermined volume of a chemical and has an inlet connected to receive the chemical from the chemical supply and an outlet for delivering the chemical to the inlet of the pump. The system also includes a flow sensor that is placed within the conduit or container to continuously monitor the actual flow rate of the gas or liquid. The meter advantageously includes a transducer device for detecting chemical level in the meter, including a low level condition, as well as a temperature sensor for detecting temperature variations of the chemical therein. According to one feature of the invention, the transducer device continuously monitors the level of the chemical being used and cooperates with the controller and other sensor devices (including the flow sensor and the temperature sensor) to insure that a predetermined pump injection rate is maintained substantially constant over an operating period (which may be several days, weeks or months). As will be seen, the system monitors how much chemical is used per stroke and insures that the injection rate remains constant irrespective of such factors as pump efficiency variations, static pressure variations, equipment performance variations, line debris and variations in the density of the chemical, which variations or problems might otherwise cause inaccuracies in the measurement of chemical usage data and/or the fluctuation of the chemical injection rate.

According to another feature of the present invention, an auxiliary audit computer is provided or suitably-programmed to facilitate the processing and presentation of raw chemical usage data collected from the injection system. The audit computer cooperates with a monitor module and is designed to be connected to the controller via an RS-232, parallel or similar interface. The module includes appropriate storage devices, such as electrically-erasable programmable read only memories, which store data collected by the controller. Time stamp data is also provided by the controller for the various system events (e.g., number of pump strokes, amount of chemical injected in pounds, parameter changes, gas flow, etc.) and stored in the module. Thus the module provides a convenient store of the date and time of each particular operational event in the system. If the available memory in the module is used up, new data is preferably written over the oldest data such that when the module is read only the most recent usage data will be present.

Although not meant to be limiting, preferably the audit computer is a general purpose personal computer running a Windows-based or other known type of graphical user interface. The module preferably collects data from the controller over a period of time, such as several months. The module is removed from the enclosure at periodic intervals and the data therein downloaded to the audit computer. Alternatively, a telephone or other suitable telecommunications connection can be provided to enclosure to enable the collected data to be downloaded via a telephone link or the like. The audit computer is suitably programmed to receive the collected data and to calculate such variables as hourly odorant usage (HOU), and daily odorant usage (DOU) in the case of gas injection systems, load odorant usage (LOU) in the case of liquid injection systems, the number of alarms generated, the average odorant injection rate, the low and high injection rates, the total odorant used, and the like. Based on such information, the audit computer can then be controlled to generate a table of such information, which can then be displayed on the CRT of the computer or printed out on an associated printer device.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a full understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 6 is a representative summary table of odorant usage event data generated by the audit computer according to the invention;

FIG. 7 is a table of system alarm status data generated by the audit computer according to the invention;

FIG. 8 is a representative system parameter table generated from the table in FIG. 6;

FIG. 9 is a representative system diagnostic table generated by the audit computer.

Similar reference characters refer to similar parts or steps throughout the several views of the drawings.

DETAILED DESCRIPTION

The present invention describes a "chemical" injection system wherein a chemical, such as an odorant, is injected into a conduit, container or the like for enabling operators to determine the presence of gas or liquid leaks. While the preferred embodiment of the invention relates to "odorant" injection, it should be readily appreciated by those of ordinary skill that the techniques and systems of the invention are readily applicable to other applications wherein it is desirable to inject a monitoring chemical into a fluid (whether liquid or gas) to thereby facilitate collection of quantitative data for analysis, adjustment and accountability. Examples of such alternative applications include, without limitation, injection of corrosion inhibitors, fuel additives, lubricants and other chemicals into pipelines or other gas or liquid conduits.

The present invention provides a total system approach to chemical or odorant injection, metering and monitoring to facilitate collection of detailed quantitative data. The injection system is extremely reliable, requires little or no maintenance, is preferably solar-powered and can be left unattended in harsh environments for long periods of time. According to one important feature of the invention, the system monitors how much odorant is used per pump stroke and insures that the odorant injection rate remains constant irrespective of environmental or equipment variations which might otherwise cause inaccuracies in the measurement of odorant usage data and/or the fluctuation of the odorant injection rate.

Figure 1:
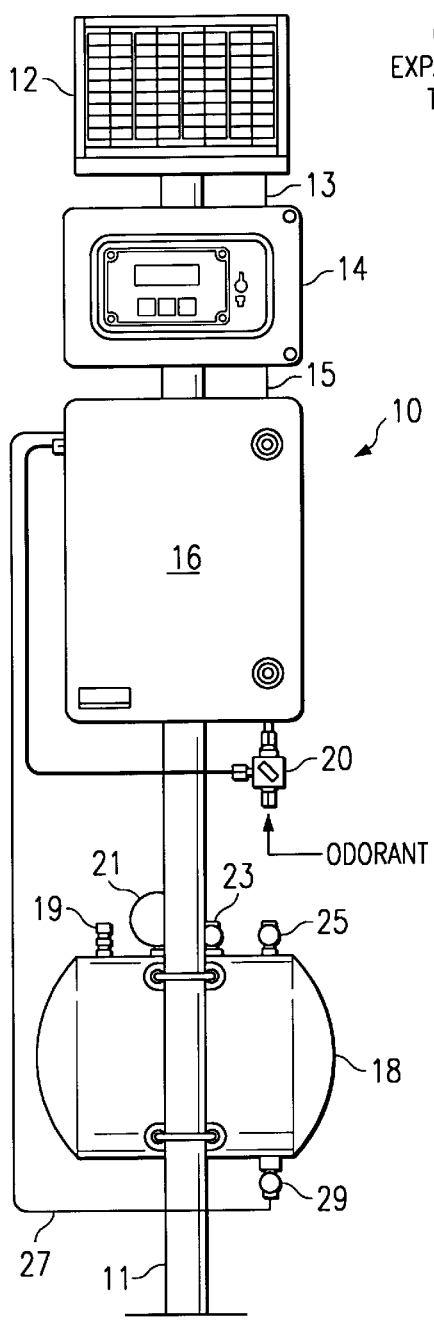
FIG. 1 is an elevation view of the preferred support structure of the invention for use in supporting the various components of the injection system.

Referring now to FIG. 1, an elevation view is shown of the basic physical components of the system. As can be seen, the system 10 is designed to be extremely portable and compact. The system 10 is preferably mounted on a support pole 11 supported in the ground adjacent the conduit or container to be monitored. Viewed from the top, the system includes a solar panel enclosure 12, a system control enclosure 14, a mechanical enclosure 16 and an expansion tank 18. An odorant inlet filter assembly 20 is also shown. Filter assembly 20 connects to an odorant source as will be explained. One or more of the enclosures 12, 14, 16 and 18 may be combined into a single integrated housing, and the solar panel may be remotely located from the remainder of the system 10. Of course, any suitable power source (such as A.C) may be used instead of or to supplement the solar powered assembly. However, since the system 10 is generally used outdoors in remote locations and remains unattended, solar power is preferred.

The solar panel enclosure 12 supports a solar panel that converts solar energy to electrical energy that is coupled to a battery supported in system control enclosure 14 via electrical connector 13. As will be described, the system control enclosure supports the battery and a microprocessor-based controller unit for controlling the operation of the system. Control and data signals are routed between the controller unit and the mechanical enclosure 16 via the electrical connector 15. The mechanical enclosure 16 supports the various mechanical elements of the system used to control odorant injection and metering. These elements include the pump and odorant inlet meter as will be described. The expansion tank 18 is designed to be mounted close to the mechanical enclosure 16 and acts as a pressure source/receiver for the odorant inlet meter. The expansion tank includes a relief valve 19, a pressure gauge 21, a vent valve 23 and an expansion tank isolation valve 25. The odorant meter is connected via conduit 27 to a bottom port 29 of the expansion tank 18.

Figure 2:
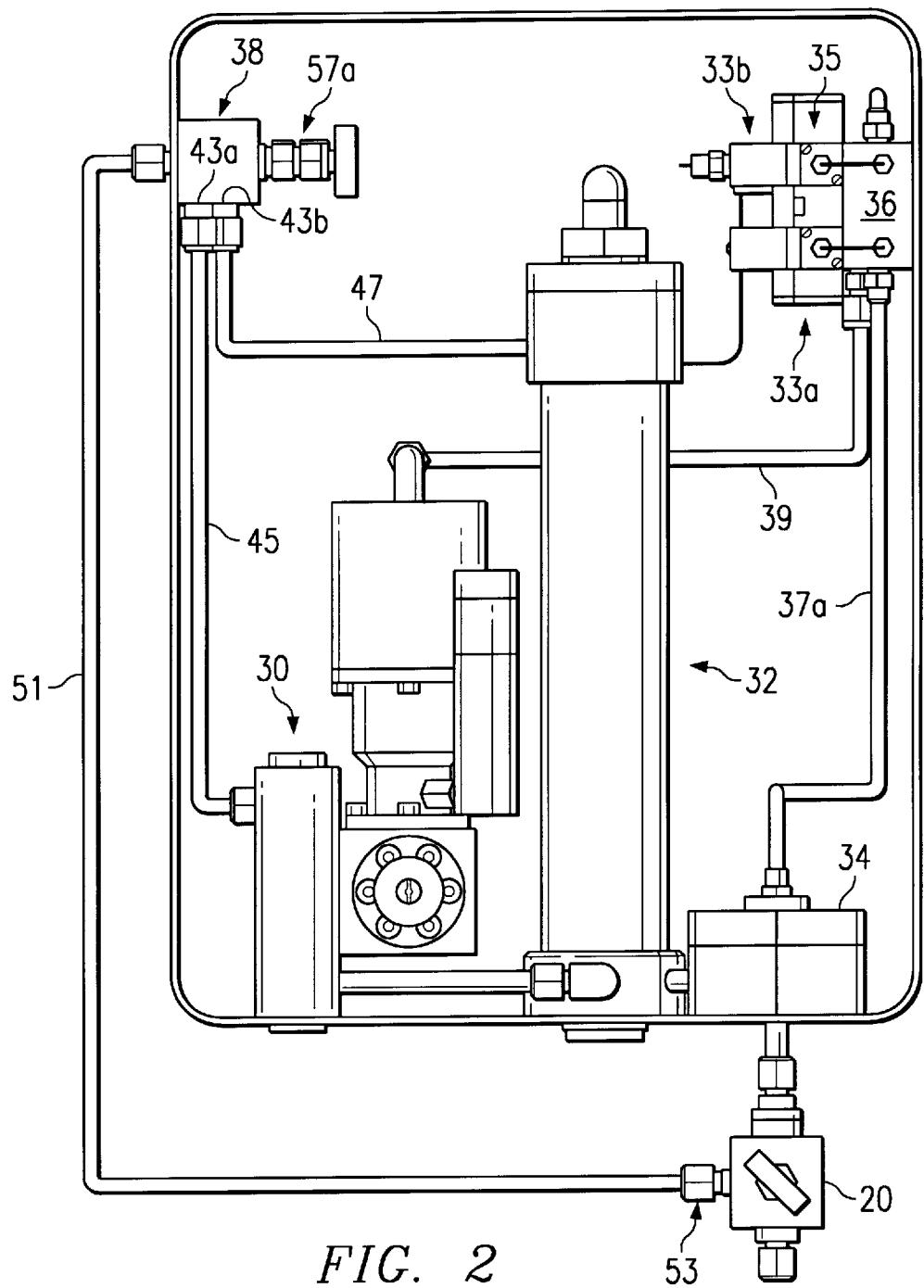
FIG. 2 is an elevation view of the mechanical enclosure of the system with an access door removed.

Turning now to FIG. 2, a detailed view is shown of the mechanical enclosure 16 with an access door removed. The enclosure 16 supports two main components of the system 10, the pump 30 and the inlet meter 32. As will be described in detail, the pump 30 injects an exact quantity of odorant at a rate determined by the controller unit. The meter 32 serves as a temperature compensated meter which verifies the amount of odorant injected by the pump.

The pump is preferably a pneumatically-actuated, positive displacement, reciprocating plunger pump. The pump is actuated with compressed air or conduit or container gas at a pressure of about 40 psi. The pump has an adjustable displacement of 0–8.0 cc. and achieves proportional-to-flow injection through adjustment of the stroke rate. One such pump is described in U.S. Pat. No. 5,032,063, which is incorporated herein by reference, assigned to the assignee of the present invention and sold under the Model No. NJEX 7000. Each time the pump is stroked, a plunger displaces hydraulic fluid against a pump diaphragm which in turn displaces odorant through a discharge check valve. The pump diaphragm acts as an isolation device between the hydraulic fluid and the odorant, minimizing the risk of odorant escape. While this particular pump offers significant advantages and is preferred, it should be appreciated that any type of positive displacement pump can be used for the pump 30 of the system 10.

Figure 3A:
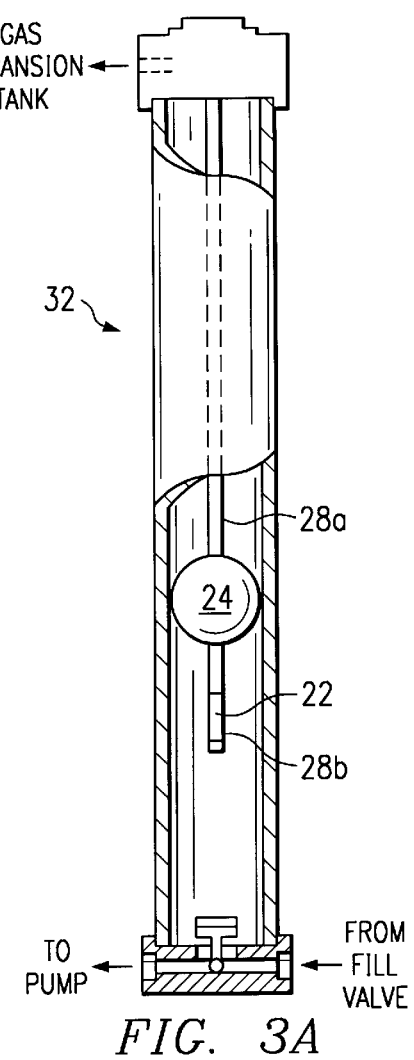
FIGS. 3A and 3B are elevations, partially cutaway, of two embodiments of an odorant meter.

Referring briefly to FIG. 3A, an elevation view, partially cutaway, is shown of a first embodiment of the odorant meter 32. As noted above, this device is used to meter a predetermined amount of odorant and to provide the controller unit with information about how efficiently the pump 30 is pumping. The meter is refilled after a predetermined amount of odorant is metered thereby to the pump. To this end, the meter includes a central stem 22 upon which a float 24 is mounted. The float is designed to ride on the stem as to track the volume of odorant in the meter. Movement of the float to a predetermined lower position will generate an electrical signal identifying that the meter needs to be refilled. As will be described, this signal is delivered to the controller, which in turn activates several valves to cause refilling of the meter from the odorant supply.

The meter 32 advantageously includes a detection device such as a level transducer 28a for continuously monitoring the level of odorant in the meter and generating an electrical signal proportional thereto. One suitable transducer is a linear displacement transducer (LDT) made by MTS of Research Triangle Park, N.C., although any suitable displacement transducers may be used. A temperature sensor 28b is also provided for generating an electrical signal proportional to temperature of the odorant within the meter. One suitable device is a two terminal monolithic integrated circuit temperature transducer (e.g., Model AD592 from Analog Devices) that provides an output proportional to absolute temperature. As will be described, the signals from the transducers 28a and 28b are provided to the controller unit to facilitate the calculation of the actual amount of odorant provided per pump stroke and to insure that the pump injection rate is maintained constant despite variations in pump efficiency, flow rate variations, odorant density fluctuations, line debris and other environmental, mechanical, hydraulic and electrical disturbances.

Figure 3B:
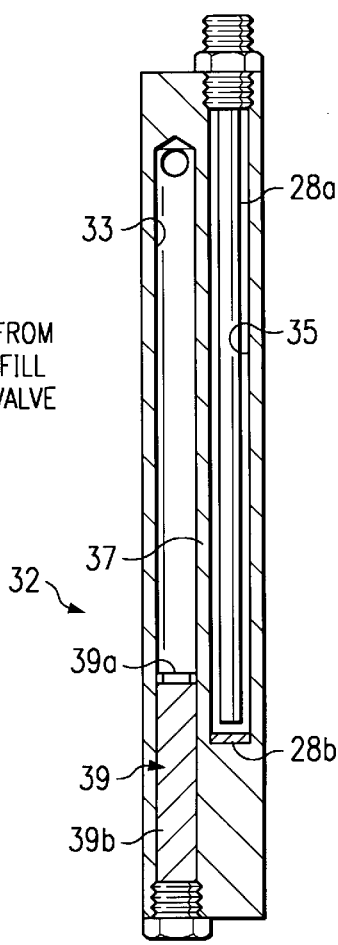

Referring now to FIG. 3B, a cross-sectional view of a second embodiment of the odorant meter 32 is shown. This meter 32 is used for containing a smaller volume of odorant than is possible by the embodiment illustrated in FIG. 3A. The smaller volume of odorant enables a higher degree of accuracy in the measurement of injected odorant. The meter 32 includes a float chamber 33 and sensor chamber 35 separated by a thin wall 37. Within the float chamber 33, a cylindrical magnet/float assembly 39 raises and lowers in response to the level of the chemical odorant. A level transducer 28a similar to that discussed with respect to FIG. 3A is inserted into the sensor chamber 35 and interacts with the magnet 39a of the magnet/float assembly 39 to generate signals indicative of the odorant level within the float chamber 33. Movement of the float 39b to a predetermined lower position will cause generation of an electrical signal idicating that the meter 32 needs to be refilled. A temperature sensor 28b as described with respect to FIG. 3A, will provide signals indicating the temperature of the odorant within the meter 32.

Referring briefly back now to FIG. 2, the odorant inlet filter assembly 20 is located below the enclosure 16 and filter's the system's odorant supply. Assembly 20 also supports an odorant filter element and an odorant return valve. The mechanical enclosure 16 also includes several other components including a fill valve 34, an actuation gas manifold 36 and an odorant discharge manifold 38. The fill valve 34 controls odorant flow into the meter 32.

The actuation gas manifold 36 houses an actuation gas supply connection and a pneumatic exhaust connection for the system. Actuation gas for the pump 30 may be provided by a local source such as the conduit or container or from a source of compressed air. The manifold also supports a pair of solenoid valves 33a–33b. One valve actuates the fill valve 34 via the conduit 37 and the other valve actuates an air relay valve 35 which in turn activates the pump 30 via conduit 39 to discharge the odorant. By using the solenoid valve and the air relay valve in series to stroke the pump, the advantages of low power consumption and rapid actuation gas delivery are provided by the system.

Figure 2A:
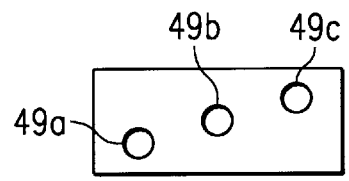
FIG. 2A is a view of the odorant discharge manifold connections.

The odorant discharge manifold 38 has two inlet connections 43a and 43b. Inlet 43a receives pump discharge via conduit 45. Inlet 43b is connected to the meter 32 via conduit 47. The odorant discharge manifold 36 includes three outlet ports 49a–49c, shown in the partial side view in FIG. 2a. Port 49a receives a bypass conduit 51 connected between the port and an outlet 53 of the odorant inlet filter assembly. Port 49b is the pipeline connection pipe which delivers the pumped odorant to the pipeline. Port 49c receives the conduit 37a (shown in FIG. 2) connected between the port and the expansion tank bottom port 29. As seen in FIG. 2, the odorant discharge manifold 36 includes a valve 57a for controlling the flow of the odorant through the manifold. A purge valve is also provided. These valves are normally closed.

Figure 4:
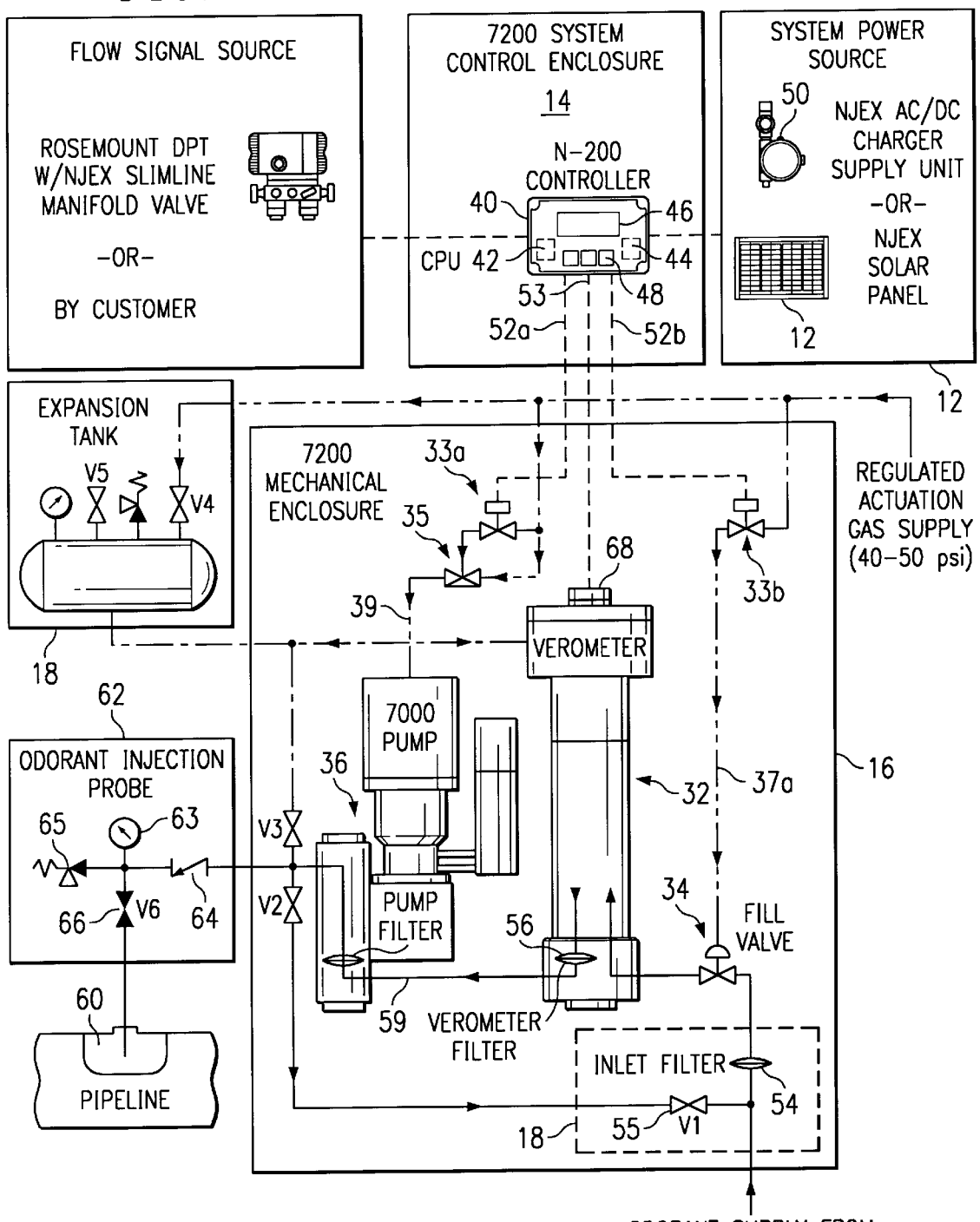
FIG. 4 is a detailed block diagram of the preferred odorant injection system configuration of the invention.

Referring now to FIG. 4, a detailed schematic diagram is shown of the system. Components previously identified are designated with the same reference numerals. Operation of the systems centers around the three primary components: pump 30, meter 34 and controller unit 40. The controller unit 40 is preferably a digital controller having a digital signal processor 42, suitable random access and read only memory 44, display 46, keyboard 48 and suitable input/output connections. The processor operates under the control of a software program to effect the various control functions described below. One of ordinary skill in the computer programming art may program the digital processor, using conventional programming languages, to provide these functions. Other input/output devices, such as a printer, may also be provided if desired.

The controller unit is powered by the solar panel assembly 12 through the battery. Alternatively, a charger unit 50 may be provided for direct electrical power through a conventional A.C. outlet. The controller unit 40 receives a flow input signal from either a flow computer (not shown) or some other flow monitoring device such as a differential pressure transducer. One such transducer is sold by Rosemount of Eden Prairie, Minnesota. The controller unit has two outputs 52a–52b, and one input 53 provided by the meter 32. Output 52b generates a control signal to control solenoid valve 33b, which actuates fill valve 34 via the conduit 37a. Output 52a generates a control signal that actuates solenoid valve 33a, which controls air relay valve 35; this in turn activates the pump 30 via conduit 39 to stroke the pump to discharge the odorant. A regulated actuation gas supply (between 40–50 psi) such as instrument air or pipeline air is supplied to the valves 33a and 33b to control the fill valve and the pump.

As also seen in FIG. 4, the odorant supply is passed through an inlet filter 54, through the fill valve and into the odorant meter. The inlet filter and an odorant return valve 55 are supported in the filter assembly 20. The meter also includes an odorant filter 56, through which the odorant passes on its way to the pump 30. Odorant is delivered to the pump 30 from the meter via conduit 59. The odorant is preferably injected into the conduit or container 60 via an odorant injection probe 62. The probe 62 includes a gauge 63, a check valve 64, a pressure relief valve 65, and a normally open valve 66. The remainder of the connections have been previously described. When the pump is actuated (via valves 33a and 35), a predetermined amount of odorant is provided to the probe 62 and then to the pipeline.

In particular, during normal operation the pump 30 injects an exact quantity of odorant at a rate determined by the controller unit 40. The quantity of odorant injected per stroke is set by the operator using a volume adjustment knob located on the front of the pump. The rate at which the pump is actuated is determined by the controller. More specifically, the controller unit 40 allows the system to operate in either a time-based mode or a proportional-to-flow mode. In the time-based mode of operation, the controller actuates the pump at a regular time interval preset by the operator. In the proportional-to-flow mode of operation, the controller uses the flow rate input signal and several operator input values to calculate the time between strokes of the pump. These operator input values or parameters are entered via the controller keyboard in a conventional manner (such as through use of a prompting scheme or operator instructions). These values include, without limitation, the desired injection rate (lbs/MMSCF) or (lbs/10Kgal), the pump displacement (cc/stroke), and the odorant density (lbs/gal). The injection rate is the desired amount of chemical (xx.xx lbs.) to be injected per million standard cubic feet of gas. The pump displacement is the amount of chemical displaced (xx.xx cc) at each stroke of the pump. The chemical density is the weight in lbs of one gallon of chemical being injected at 20 degrees centigrade.

According to the present invention the injection system is used to inject the chemical, e.g., the odorant, into the gas pipeline at a predetermined rate which as noted above is preferably set in pounds per million standard cubic feet (MMSCF) of gas or at pounds per ten thousand gallons (lbs/10Kgal) of liquid. Significantly, during the proportional-to-flow operation, the controller unit allows the system the ability to maintain the set injection rate even though there are variations in gas pipeline flow, odorant density, actual pump displacement or other such variations. This operation can be seen by considering the following formula:

$$\text{Pump Stroke Rate (sec/stroke)} = \frac{\dfrac{\text{Pump Displacement}}{(\text{cc/stroke})} \times \dfrac{\text{Chemical Density}}{(\text{lbs/gallon})} \times (.951123)}{\dfrac{\text{Injection Rate}}{(\text{lbs/MMSCF}) \text{ or }} \times \dfrac{\text{Actual Flow Rate}}{(\text{MMSCF/hr}) \text{ or}}}$$
$$(\text{lbs/10K gal}) \quad (\text{lbs/10K gal})$$

The Injection Rate, the Pump Displacement and Chemical Density are user-settable parameters. The Actual Flow Rate is sensed by the flow monitoring device in a conventional manner. The value (0.951123) is a conversion constant.

As can be seen by solving the above equation for Injection Rate, it is possible to selectively alter, or adjust for variations in, one or more other variables to insure that the Injection Rate can be maintained constant. This is one of the important functions of the controller unit of the present invention. Thus, for example, as temperature variations sensed by sensor 28b alter the Chemical Density of the odorant, the Injection Rate changes (assuming all other variables remain constant). Likewise, variations in the Actual Flow Rate alter the Injection Rate (if all other variables remain constant). Further, using transducer 28a the controller unit monitors the actual odorant leaving the meter and compares this value to the preset Pump Displacement to determine the actual Pump Displacement, which may vary over time due to pump efficiency variations or the like. Thus while the Pump Displacement may be set for 1.0 cc/stroke, the comparison of the transducer 28a output and the expected pump output (measured in number of strokes×the preset Pump Displacement) might indicate some variation in the actual Pump Displacement. This variation will also impact the Injection Rate (all other variables being constant).

Thus according to the invention the controller unit continually monitors the actual Pump Displacement (as calculated by comparing the transducer 28*a* output and the expected pump output), the Chemical Density (as calculated from the transducer 28*b* output), and the Actual Flow Rate, and in response thereto generates a control signal for controlling the rate at which the pump is stroked to thus maintain the preset injection rate. By using the actual odorant value and correcting for temperature (and thus density) and flow rate variations, the controller provides dynamic and real-time control over the injection system which has heretofore been unavailable in such systems.

The flow input signal is provided by either a flow computer or other flow monitoring device. In the proportional-to-flow operative mode, the controller 40 distinguishes between a low flow situation and a loss of flow input signal. In the event of a loss of flow signal, the controller unit automatically defaults back to a preselected percentage of the flow input. The flow input signal is read by the controller preferably eight times per pump stroke. These readings are averaged and the time duration until the next stroke is then calculated by the controller.

The meter 32 thus advantageously serves to meter the odorant into the pump and also to monitor the actual pump displacement. This is achieved through the level transducer 28*a* which measures the exact odorant displaced from the meter, a value which can then be continuously compared to the expected pump output (in preset cc/strokes×a number of strokes) to determine the true pump efficiency over a period of time. By monitoring true pump displacement that varies over time (as well as odorant density and actual flow rate), the system compensates for environmental and other factors by altering the stroke rate of the pump to maintain the preset injection rate constant. The meter 32 serves as a monitoring and metering device which facilitates the verification of the actual amount of odorant injected by the pump, and this value is then selectively and continuously used to alter the pump stroke rate as needed.

The controller unit 40 receives the various signals at input 53 from the meter provided over the electrical connector 68, which preferably includes a number of conductors. One conductor is connected to the meter level transducer and signals the controller unit when the odorant level has fallen below a predetermined level. As noted above, the controller responds to this condition by actuation of solenoid valve 33*a* and the fill valve. The other conductors are connected to the level transducer 28*a* and the temperature transducer 28*b*. These signals are provided to the controller to facilitate precise calculation of the odorant injected as described above.

Thus the invention facilitates the calculation of the precise amount of odorant injected. Prior art systems merely provided a coarse value for the odorant injected because they did not take into consideration the effects of pump efficiency variations, flow rate, temperature and the like.

As also seen in FIG. 4, the upper portion of the meter is connected to the gas expansion tank to enable gas, which would otherwise be entrained in the odorant, to bubble off. The entire odorant injection system thus operates in a closed loop manner to provide precise control of odorant injection, metering and monitoring. This closed loop operation is provided because as the meter (which is a sealed tube) is filled, the air within the meter is delivered into the expansion tank. As the odorant level is decreased, the displaced air is drawn back into the meter to maintain a static pressure.

Figure 5:
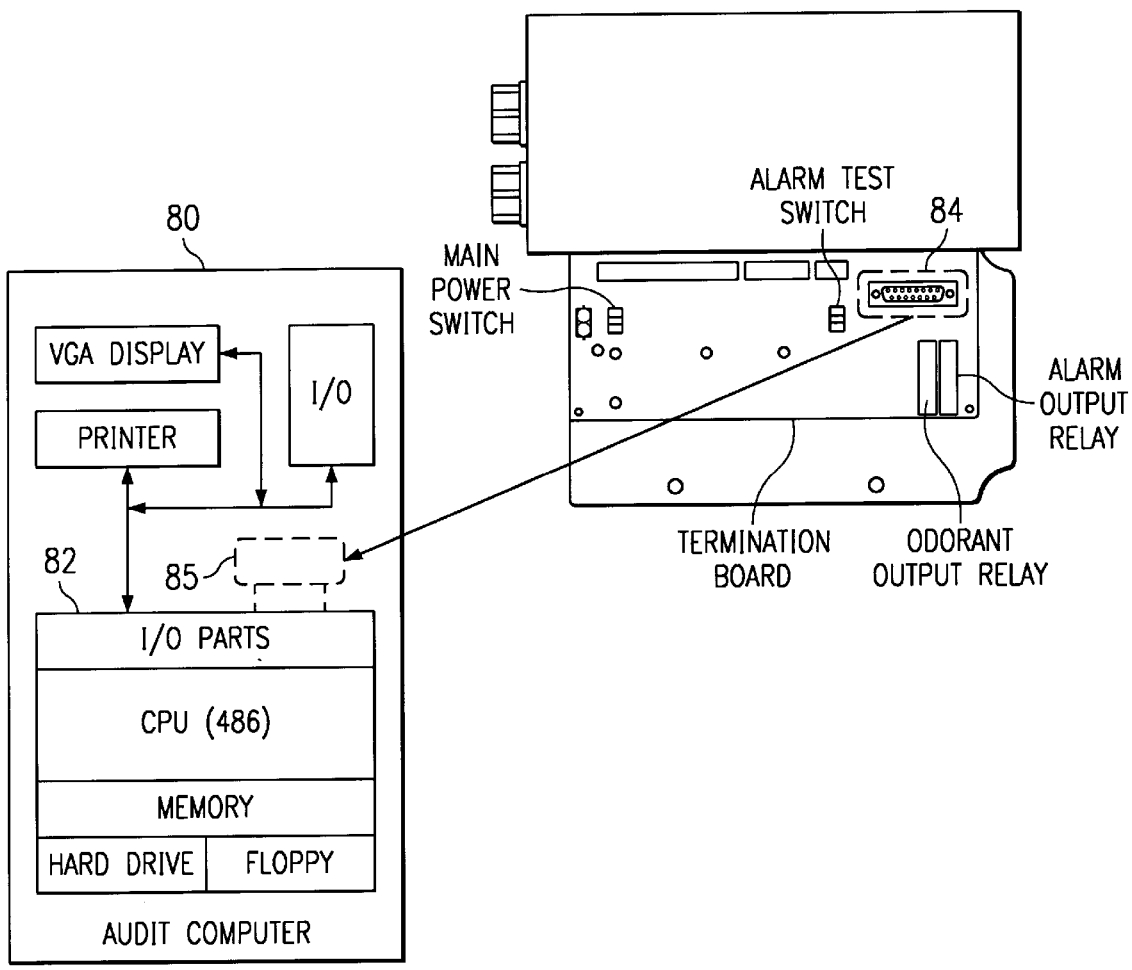
FIG. 5 is a block diagram of the auxiliary audit system of the present invention.

According to another important feature of the present invention, the system include an auxiliary audit system which operates in conjunction with the controller unit to facilitate accurate and detailed reporting of how the system has operated over an extended period of time. The audit system 80 is shown schematically in FIG. 5 and includes an audit controller 82 and a removable monitor module 84. Module 84 is designed to be connected to the controller unit 40 via an RS-232, parallel or similar interface 85. The module includes appropriate storage devices, such as electrically-erasable programmable read only memories, which store data collected by the controller unit 40. Time stamp data is also provided by the unit 40 for the various system events (e.g., alarms, total pump strokes, total pounds injected, etc.) and stored in the module. Thus the module provides a convenient store of the date and time of each particular operational event in the system. If the available memory in the module is used up, new data is preferably written over the oldest data such that when the module is read only the most recent usage data will be present.

Although not meant to be limiting, preferably the audit controller 82 is a general purpose personal computer running an MS-DOS operating system with Microsoft Windows Version 3.1 or other graphical user interface. Such a computer system is well known and provides a convenient graphical user interface (GUI) that cooperates with point and click or keyboard input devices in a well-known manner.

The module 84 preferably collects data from the controller unit 40 over a period of time, such as several months. The module is removed from the enclosure at periodic intervals and the data therein downloaded to the audit controller. Alternatively, a telephone or other suitable telecommunications connection can be provided to the enclosure to enable the collected data to be downloaded via a telephone link or the like. In the case of a telephone link, a modem is provided as is well known. The memory module may be integrated into the controller unit 40 instead of being a replaceable device. The audit controller is suitably programmed to receive the collected data and to calculate such variables as hourly odorant usage (HOU), daily odorant usage (DOU), load odorant usage (LOU), the number of alarms generated, the average odorant injection rate, the low and high injection rates, the total odorant used, and the like. Based on such information, the audit controller can then be controlled to generate a table of such information, which can then be displayed on the CRT of the computer or printed out on a printer device. A hard disk, CD-ROM or other storage device is used to maintain the data (in raw or table format) to provide an audit trail for reporting purposes.

The tables generated by the audit controller may be manipulated in a variety of fashion to optimize the usability of the table displays to a user. One example of a means of manipulation of said table is a setup selection function enabling a user to adjust the tables to display only the odorant usage data by the system be it either daily odorant usage or load odorant usage data or to display only event data in the tables. The odorant usage data describes the odorant usage for a particular unit of measure, and the event data describes alarm data, parameter change data, system change data, ect. When only the odorant usage or event data are displayed, a prompt is included at the top of the table to indicate this condition.

By way of example only, one such table generated by the audit controller is shown in FIG. 6. This report summarizes the data for a particular period defined by log start and end dates. By using function keys on the keyboard, the user can select different days or tag certain fields. For example, with the cursor located adjacent the DOU field, depression of the F1 function key allows the user to pull down a window showing HOU for the particular day. Depression of the F2 function key allows the operator to select a different date to generate a new table. Depression of the F3 key enables the operator to view the time and date of the next alarm condition after the day shown. An example of a system alarm status screen is shown in FIG. 7. A user is more easily able to ascertain the system alarm whose condition has most recently changed due to a status marker 100 indicating that the status of an alarm has changed (e.g., turned on or turned off) from the previously recorded time period. If the F4 key is depressed, a window is created to allow the operator to view the system parameters for the time period in question. An example of a system parameter screen display is shown in FIG. 8.

The audit controller is also programmed to generate a table of diagnostic information from the collected data to assist with troubleshooting of the odorant injection system. A parameter selection table enables selection of particular parameters for viewing. The parameters may be individually selected or a number of default values may be selected. Examples of parameters within the diagnostics selection table would include: flow voltage, expansion tank pressure, verometer %, battery voltage, display temperature, odorant temperature, pump displacement, flow % and odorant tank %. This list of diagnostic parameters is, of course, merely illustrative and any other parameters suitable for various chemical injection systems would be sufficient for purposes of the diagnostic table. A diagnostic table, as shown in FIG. 9, provides information concerning the selected diagnostic parameters for various time periods within the system. With this table, systems problems may be tracked based upon the diagnostic parameters.

The above-identified display screens are merely exemplary. The raw odorant usage data may be processed into any suitable record format to facilitate the presentation of the summary data.

Figure 10:
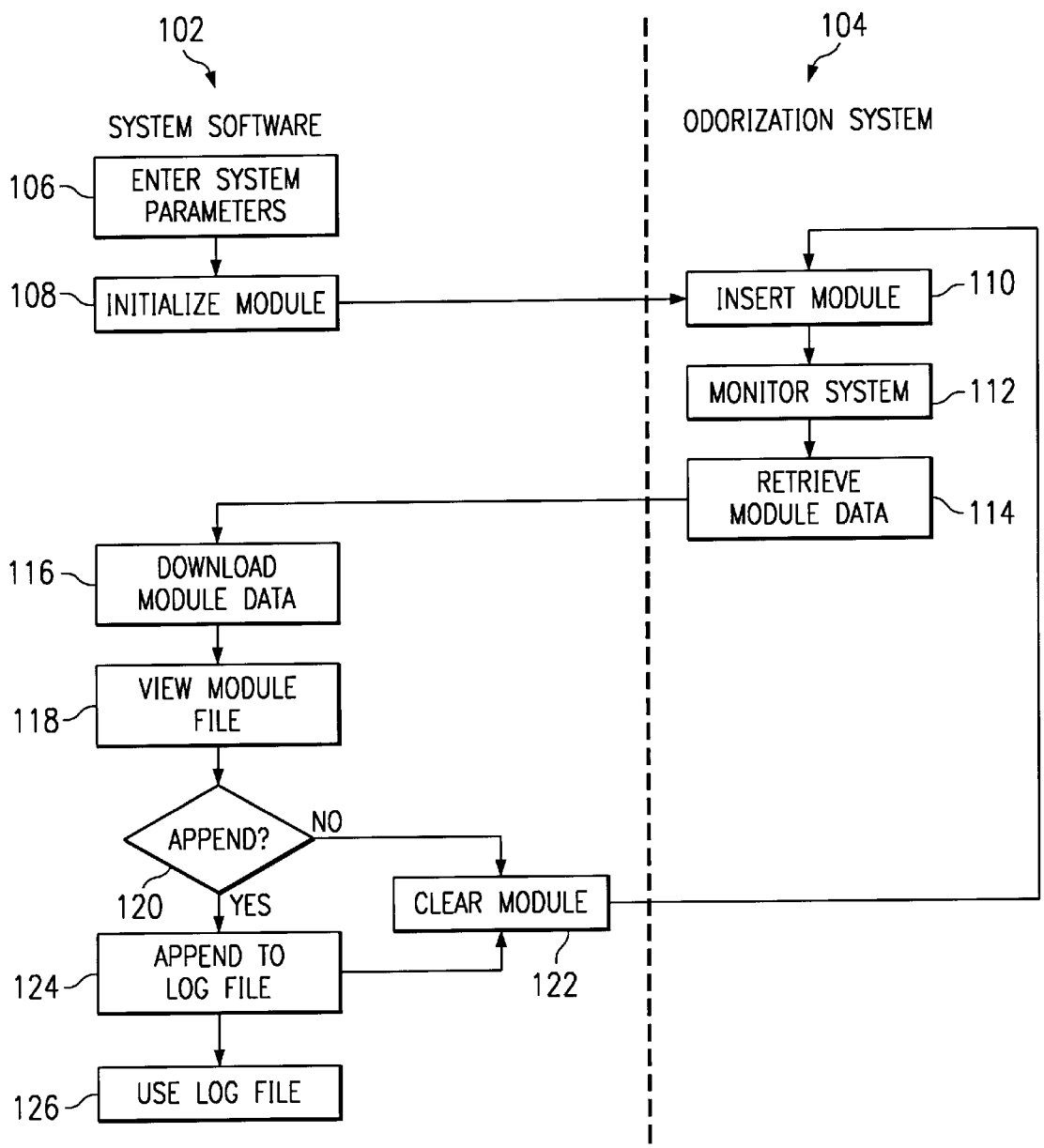
FIG. 10 is a flow diagram illustaiting the operation of the system.

Referring now to FIG. 10, there is illustrated a flow diagram illustrating the general operation of the chemical injection system of the present invention. As can be seen from FIG. 10, the system's major components comprises the system software 102 and the odorization system 104. Initially, the odorization system information parameters are entered at step 106 into the module set up of the system software. The monitor module 84 is then initialized at step 108 to create a log file for a particular odorization system 104. A log file comprises the overall monitoring history for a particular odorization system 104. Next, a cleared monitor module 84 is inserted at step 110 into the odorization system. The module 84 monitors at step 112 the odorization system for a predetermined period of time. An individual may then retrieve at step 114 the monitor module data from the odorization system 104 by physically interchanging the module with a cleared module or accessing the data within the module over a communications interface. The module data is downloaded into the odorization software 102 at step 116 to create a module file. A module file contains all of the data retrieved from a module. The module file may be viewed at step 118 by a user to determine whether or not the module file should be appended at step 120 to the log file for the odorization system 104. If the module file is not to be appended to the log file, the monitor module is cleared at step 122 and may be reinserted into the odorization system at step 114 by physically placing the module in the system or instructing the module to continue system monitoring over the communications interface. Otherwise, the module file is appended to the log file at step 124 before clearing the module at step 122. The log file may then be used at step 126 for a variety of purposes, including printing out reports generating text files or creating a permanent report of the odorization system operation.

It should be appreciated that the use of a dedicated audit controller provides significant audit and reporting capabilities for the system. The user can generate individual reports for each day of monitoring, and these reports can be manipulated and stored for future audit or reporting use. Precise hourly and daily odorant use data can be calculated, displayed and recorded to enable the operator to know exactly how the system is operating in the field. The invention thus facilitates the primary objectives of all gas odorization programs, namely to provide for the public welfare and safety, and to meet or exceed regulatory requirements.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A system for injecting a chemical from a chemical supply into a fluid containing system at a desired injection rate, comprising:

a pump having an inlet, and an outlet connectable to the fluid containing system, the pump having an adjustable stroke rate;

a meter supporting a predetermined volume of the chemical and having an inlet connected to receive the chemical from the chemical supply and an outlet for delivering the chemical to the inlet of the pump;

a level transducer for continuously monitoring a level of the chemical in the meter and generating a chemical level signal proportional thereto; and a controller operative under the control of a program stored therein and responsive to the chemical level signal for generating a control signal for selectively altering the stroke rate of the pump to maintain the injection rate substantially constant over a predetermined time period.

2. The chemical injection system as described in claim 1 further including;

a flow rate transducer located in the fluid containing system for generating a flow rate signal proportional to the flow rate of the fluid in the fluid containing system; and wherein the controller is also responsive to the flow rate signal to generate the control signal.

3. The chemical injection system as described in claim 1 further including;

a temperature transducer located in the meter for generating a temperature signal proportional to the temperature of the chemical in the meter; and wherein the controller is also responsive to the temperature signal to generate the control signal.

4. The chemical injection system as described in claim 1 further including;

a flow rate transducer located in the fluid containing system for generating a flow rate signal proportional to the flow rate of the fluid in the fluid containing system;

a temperature transducer located in the meter for generating a temperature signal proportional to the temperature of the chemical in the meter; and wherein the controller is also responsive to the flow rate signal and the temperature signal to generate the control signal.

5. The chemical injection system as described in claim 1 further including an expansion tank connected to the meter.

6. The chemical injection system as described in claim 1 further including an audit system for collecting chemical usage data.

7. The chemical injection system as described in claim 6 wherein the audit system includes a memory module for storing chemical injection event data, and an audit controller.

8. The chemical injection system as described in claim 1 further including means for supplying electrical energy to power the controller.

9. The chemical injection system as described in claim 8 wherein the means for supplying electrical energy is a solar panel.

10. A control system for delivering odorant from an odorant receptacle into a gas pipeline, comprising:
- a level sensor monitoring a level of odorant in the receptacle and generating a first signal proportional thereto;
- a flow sensor monitoring flow of the gas in the gas pipeline and generating a second signal proportional thereto;
- a temperature sensor monitoring temperature of the odorant in the receptacle and generating a third signal proportional thereto;
- a valve having a gas inlet, and an outlet, the gas inlet receiving gas diverted from the gas pipeline;
- a controller receiving the first, second and third signals and in response generating a control signal that actuates the valve to control the delivery of odorant into the gas pipeline at a predetermined odorization rate; and
- a memory storing data representing an amount of odorant delivered into the gas pipeline.

11. The system as described in claim 10 wherein the memory also stores audit trail data detailing performance of the control system over a given time period.

12. The system as described in claim 10 wherein the memory also stores data representing an odorization rate.

13. The system as described in claim 10 wherein the memory also stores data representing an alarm.

14. The system as described in claim 10 further including a computer connectable to receive a download of at least a portion of the data.

15. The system as described in claim 10 wherein the controller is a computer operating under the control of a program stored therein.

16. The system as described in claim 10 wherein the receptacle is an odorant meter.

17. The system as described in claim 10 wherein the level sensor is a linear displacement transducer.

18. A method for delivering odorant from an odorant receptacle into a gas pipeline, comprising the steps of:
- monitoring a level of odorant in the receptacle and generating a first signal proportional thereto;
- monitoring flow rate of the gas in the gas pipeline and generating a second signal proportional thereto;
- monitoring temperature of the odorant in the receptacle and generating a third signal proportional thereto;
- generating a control signal in response to the first, second and third signals;
- controlling the delivery of odorant into the gas pipeline at a predetermined odorization rate as a function of the control signal; and
- storing audit data generated as a result of delivery of the odorant.

* * * * *